US012585806B2

(12) United States Patent
Garg et al.

(10) Patent No.: US 12,585,806 B2
(45) Date of Patent: Mar. 24, 2026

(54) METHOD AND SYSTEM FOR PRIVACY-PRESERVING WORKFLOW VALIDATIONS IN SERVERLESS CLOUDS

(71) Applicant: Tata Consultancy Services Limited, Mumbai (IN)

(72) Inventors: Surabhi Garg, New Delhi (IN); Rajan Mindigal Alasingara Bhattachar, Bangalore (IN); Meena Singh Dilip Thakur, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 371 days.

(21) Appl. No.: 18/223,136

(22) Filed: Jul. 18, 2023

(65) Prior Publication Data

US 2024/0061945 A1 Feb. 22, 2024

(30) Foreign Application Priority Data

Aug. 22, 2022 (IN) .............................. 202221047766

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01)

(58) Field of Classification Search
CPC .. G06F 21/6218; G06F 21/602; G06F 21/604; G06F 2221/2113; G06F 2221/2141; H04L 9/3226; H04L 63/105
See application file for complete search history.

(56) References Cited

U.S. PATENT DOCUMENTS

| | | | | |
|---|---|---|---|---|
| 2020/0120102 A1* | 4/2020 | Cybulski | ............... | H04L 63/101 |
| 2020/0267155 A1* | 8/2020 | Segal | ...................... | H04L 63/20 |
| 2021/0144013 A1* | 5/2021 | Chen | ..................... | H04L 9/0894 |

FOREIGN PATENT DOCUMENTS

EP 2658204 A1 * 10/2013 ........... H04L 63/104

* cited by examiner

*Primary Examiner* — Han Yang
(74) *Attorney, Agent, or Firm* — Finnegan, Henderson, Farabow, Garrett & Dunner, LLP

(57) ABSTRACT

State of the art approaches used to address security aspects in serverless platforms perform workflow validations on an end to end flow, however, this cannot prevent attacks targeted at intermediate function calls in the workflow. Further, the existing systems store policy data in insecure manner, which causes security issues. The disclosure herein generally relates to serverless clouds, and, more particularly, to a method and system for privacy-preserving workflow validations in serverless clouds. The system stores policy data in a secured/encrypted manner. The system also performs validations at different levels, at a first level to allow/deny access at an ingress point, and at a second level to allow/deny access at critical intermediate points. This approach thus provides safety against attacks that may have been initiated post initial validation, and offers added data security.

12 Claims, 8 Drawing Sheets

200

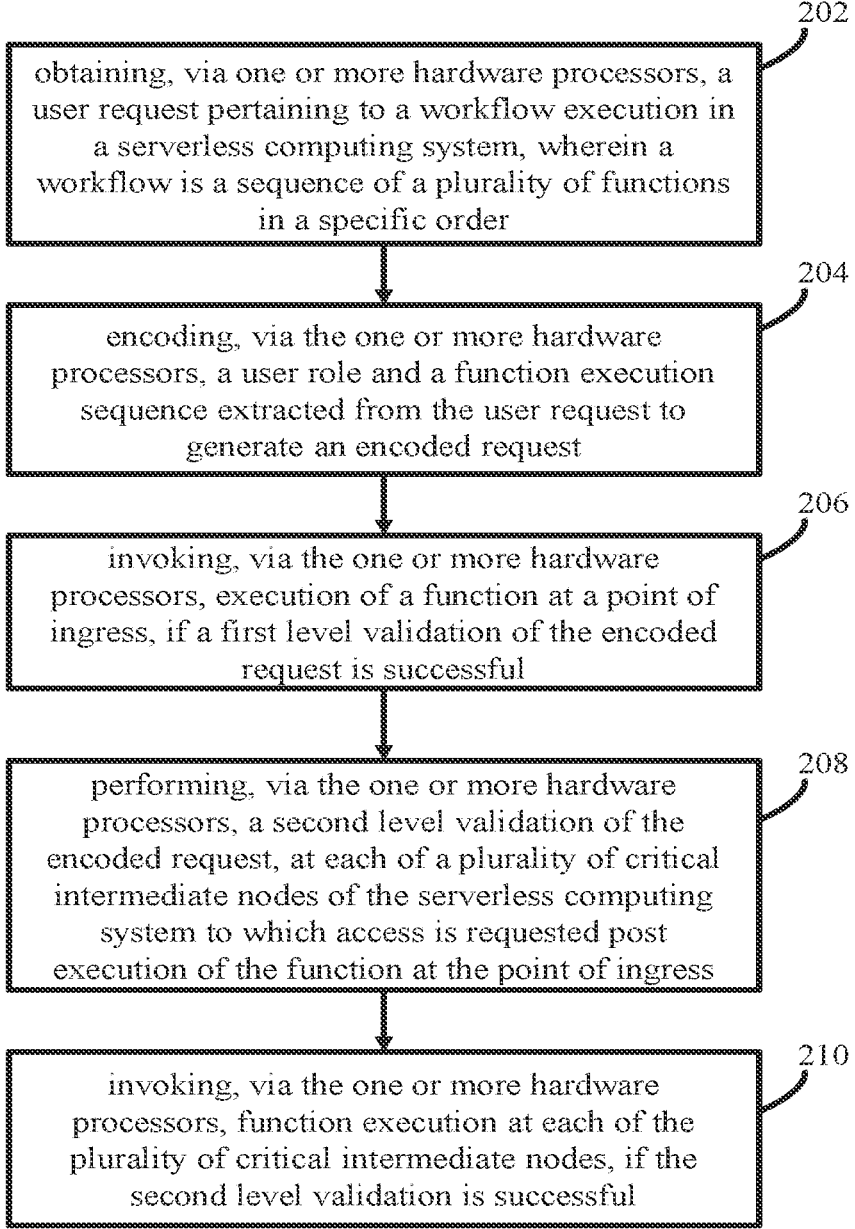

202 obtaining, via one or more hardware processors, a user request pertaining to a workflow execution in a serverless computing system, wherein a workflow is a sequence of a plurality of functions in a specific order

204 encoding, via the one or more hardware processors, a user role and a function execution sequence extracted from the user request to generate an encoded request

206 invoking, via the one or more hardware processors, execution of a function at a point of ingress, if a first level validation of the encoded request is successful

208 performing, via the one or more hardware processors, a second level validation of the encoded request, at each of a plurality of critical intermediate nodes of the serverless computing system to which access is requested post execution of the function at the point of ingress

210 invoking, via the one or more hardware processors, function execution at each of the plurality of critical intermediate nodes, if the second level validation is successful

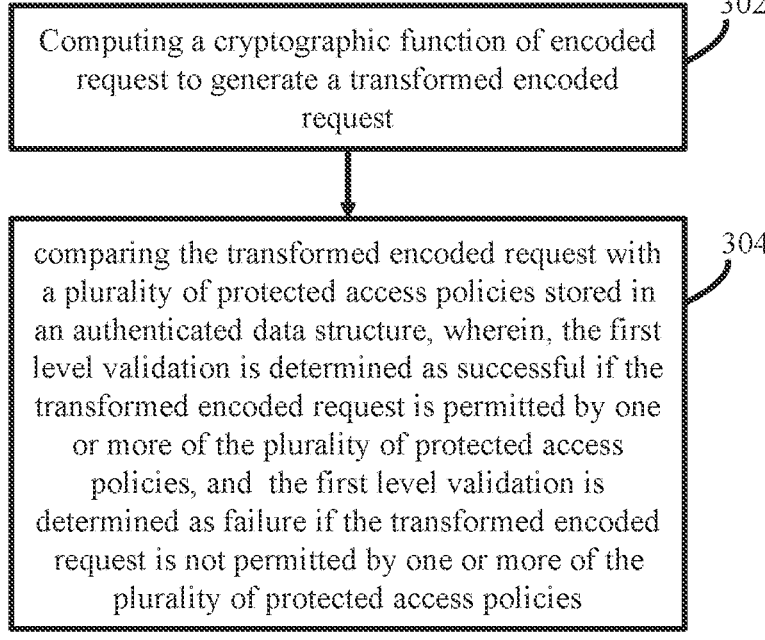

302

Computing a cryptographic function of encoded request to generate a transformed encoded request

304 comparing the transformed encoded request with a plurality of protected access policies stored in an authenticated data structure, wherein, the first level validation is determined as successful if the transformed encoded request is permitted by one or more of the plurality of protected access policies, and the first level validation is determined as failure if the transformed encoded request is not permitted by one or more of the plurality of protected access policies

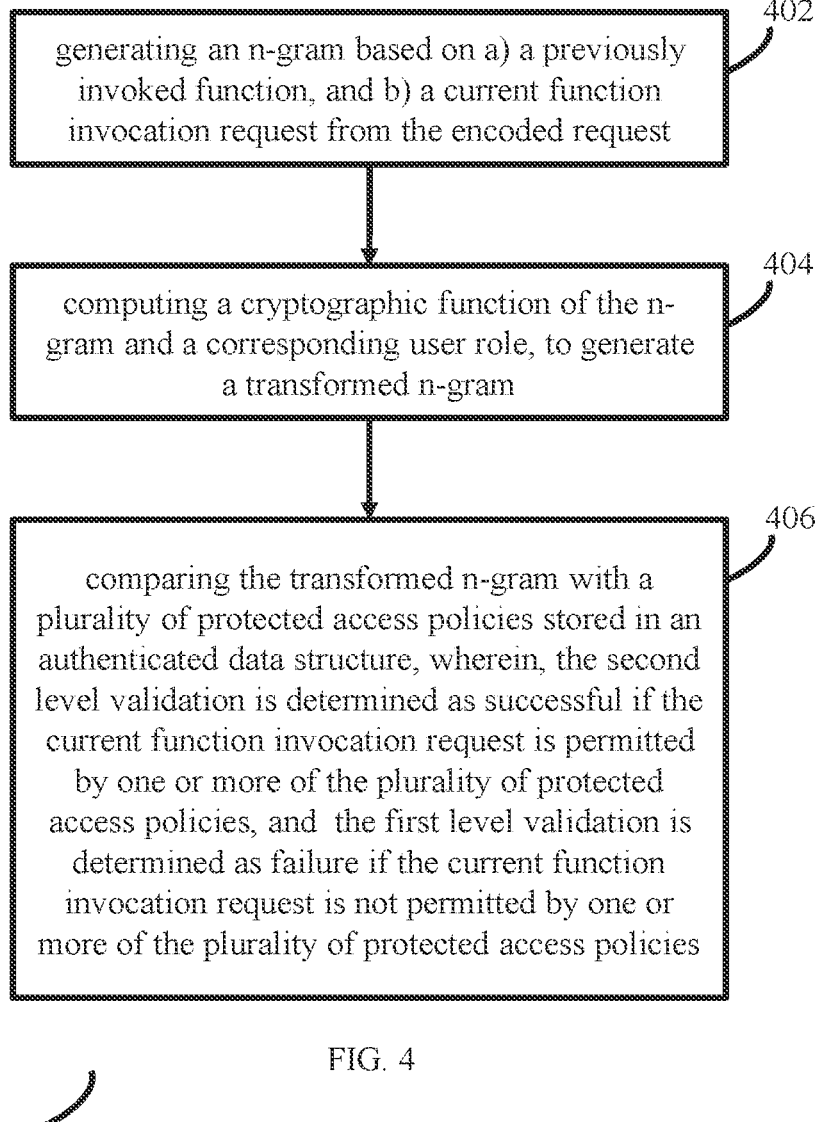

generating an n-gram based on a) a previously invoked function, and b) a current function invocation request from the encoded request                                402 computing a cryptographic function of the n-gram and a corresponding user role, to generate a transformed n-gram                                404 comparing the transformed n-gram with a plurality of protected access policies stored in an authenticated data structure, wherein, the second level validation is determined as successful if the current function invocation request is permitted by one or more of the plurality of protected access policies, and the first level validation is determined as failure if the current function invocation request is not permitted by one or more of the plurality of protected access policies                                406

METHOD AND SYSTEM FOR PRIVACY-PRESERVING WORKFLOW VALIDATIONS IN SERVERLESS CLOUDS

PRIORITY CLAIM

This U.S. patent application claims priority under 35 U.S.C. § 119 to: Indian Patent Application No. 202221047766, filed on Aug. 22, 2022. The entire contents of the aforementioned application are incorporated herein by reference.

TECHNICAL FIELD

The disclosure herein generally relates to serverless clouds, and, more particularly, to a method and system for privacy-preserving workflow validations in serverless clouds.

BACKGROUND

Serverless cloud computing has gained popularity of late, as it allows users to run applications without having to worry about server maintenance and other hardware specific concerns. Serverless computing allows users to deploy their entire code as multiple individual functions, without taking care of the underlying infrastructure, and other resources. Due to certain critical vulnerabilities or misconfigurations in the cloud architecture, the inter-communication of data at function level results in some serious security and privacy concerns, particularly related to the information flow in the serverless workflows.

Some systems exist to address such security concerns in the serverless platforms. Some of the existing systems use a policy based approach for workflow validation. However, they store policy related information such as a user's roles and privileges, in an insecure manner, leading to privacy and security related issues. For example, attackers may gain unauthorized access to the policy data, and may even tamper with the policy data, which may compromise data security. The existing systems perform workflow validations on an end to end flow at once i.e. before function execution begins. However, this cannot prevent attacks targeted at intermediate function calls in the workflow.

SUMMARY

Embodiments of the present disclosure present technological improvements as solutions to one or more of the above-mentioned technical problems recognized by the inventors in conventional systems. For example, in one embodiment, a processor implemented method is provided. The method involves obtaining via one or more hardware processors, a user request pertaining to a workflow execution in a serverless computing system, wherein a workflow is a sequence of a plurality of functions in a specific order. Further, a user role and a function execution sequence extracted from the user request are encoded, via the one or more hardware processors, to generate an encoded request. Further, execution of a function at a point of ingress is invoked, via the one or more hardware processors, if a first level validation of the encoded request is successful. Further, a second level validation of the encoded request is performed via the one or more hardware processors, at each of a plurality of critical intermediate function calls of the serverless computing system to which access is requested post execution of the function at the point of ingress.

Function execution at each of the plurality of critical intermediate function calls is invoked via the one or more hardware processors, if the second level validation is successful.

In another aspect, A system is provided. The system includes one or more hardware processors, a communication interface, and a memory storing a plurality of instructions. The plurality of instructions cause the one or more hardware processors to obtain a user request pertaining to a workflow execution in a serverless computing system, wherein a workflow is a sequence of a plurality of functions in a specific order. Further, a user role and a function execution sequence extracted from the user request are encoded, via the one or more hardware processors, to generate an encoded request. Further, execution of a function at a point of ingress is invoked, via the one or more hardware processors, if a first level validation of the encoded request is successful. Further, a second level validation of the encoded request is performed via the one or more hardware processors, at each of a plurality of critical intermediate function calls of the serverless computing system to which access is requested post execution of the function at the point of ingress. Function execution at each of the plurality of critical intermediate function calls is invoked via the one or more hardware processors, if the second level validation is successful.

In yet another aspect, a non-transitory computer readable medium is provided. The non-transitory computer readable medium includes a plurality of instructions, which when executed, cause the following steps. Initially, a user request pertaining to a workflow execution in a serverless computing system is obtained, via one or more hardware processors, wherein a workflow is a sequence of a plurality of functions in a specific order. Further, a user role and a function execution sequence extracted from the user request are encoded, via the one or more hardware processors, to generate an encoded request. Further, execution of a function at a point of ingress is invoked, via the one or more hardware processors, if a first level validation of the encoded request is successful. Further, a second level validation of the encoded request is performed via the one or more hardware processors, at each of a plurality of critical intermediate function calls of the serverless computing system to which access is requested post execution of the function at the point of ingress. Function execution at each of the plurality of critical intermediate function calls is invoked via the one or more hardware processors, if the second level validation is successful.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram depicting steps involved in the process of workflow validation in serverless platforms, by the system of FIG. 1, according to some embodiments of the present disclosure.

FIG. 3 is a flow diagram depicting steps involved in a first level of validation in the process of workflow validation performed by the system of FIG. 1, according to some embodiments of the present disclosure.

FIG. 4 is a flow diagram depicting steps involved in a second level of validation in the process of workflow validation performed by the system of FIG. 1, according to some embodiments of the present disclosure.

DETAILED DESCRIPTION

Figure 1:
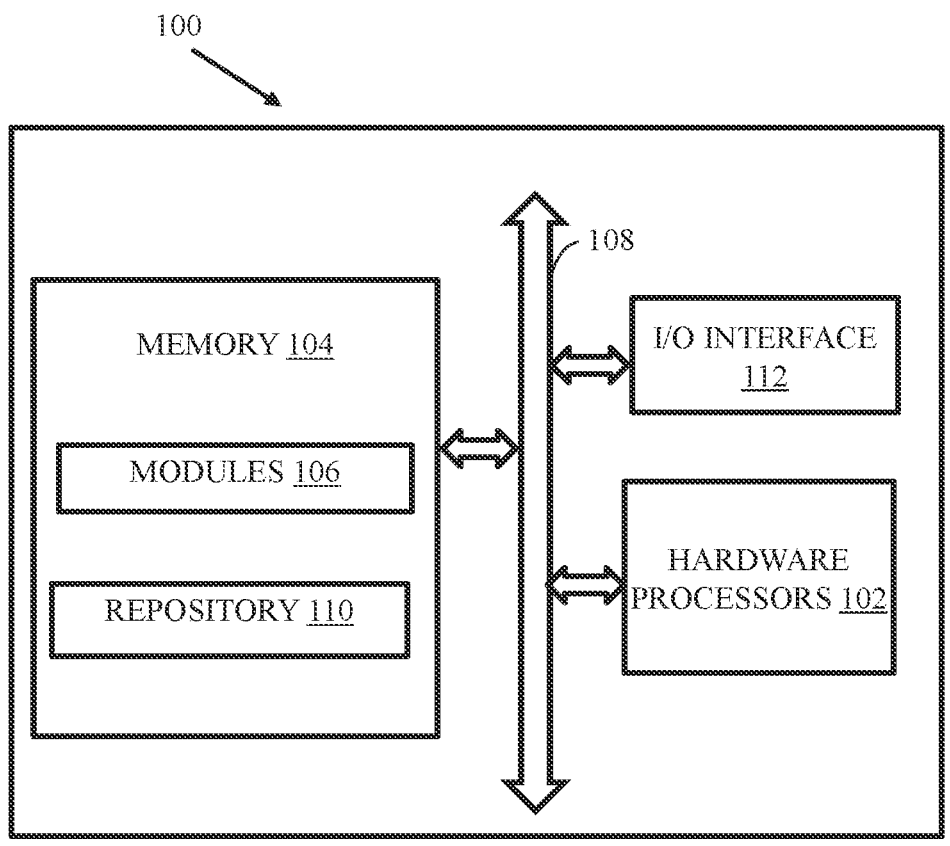
FIG. 1 illustrates an exemplary system for workflow validation in serverless platforms, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Systems that exist to address workflow related security concerns in serverless platforms have one or more of the following disadvantages. Some of the existing systems use a policy based approach for workflow validation. However, they store policy related information in an insecure manner, leading to privacy and security related issues. For example, attackers may gain unauthorized access to the policy data, and may even tamper with the policy data, which may compromise data security. The existing systems perform workflow validations on an end to end flow at once i.e. before function execution begins. However, this cannot prevent attacks targeted at intermediate function calls in the workflow.

Some of the existing approaches and their disadvantages are described below.

Trapeze proposed by Alpernas et al. is a function's programming language dependent approach for dynamic information flow control in the serverless cloud architecture. Each function is sand-boxed in a security shim that monitors all the input output operations of the function invocations. A lattice of security labels is constructed where the labels represent the security classes of information flowing through the system. The approach has huge run-time overheads due to the expensive SQL operations involved. Further, it requires additional external services modifications to enable the working of serverless functions within the Trapeze which contribute to the overhead.

In SecLambda, each serverless function is executed in a modified runtime environment that captures the current state of the function to a security guard. The guard is responsible to run a set of security functions based on the security policies represented in the form of flow graph managed with the help of a centralized controller. The approach requires huge code instrumentation and agent embedding, thus has high compilation and runtime overheads.

Valve is another workflow protection approach where an agent sits in every container and monitors all the API calls and disk information flow in the serverless application. The workflow developers specify the policies in the form of a look up table. A Valve controller is present that audits and enforces the policies, thus denying any illegitimate behaviour or wrong information flow by a function. However, Valve requires cooperation from third parties to propagate the information about the function level operations and has improper resource utilization.

Another work titled "Workflow Integration Alleviates Identity and Access Management in Serverless Computing", by Sankaran et. Al, hereinafter referred to as WILL.IAM, encodes all the information regarding function level information flows in the form of graphs. Based on the access control policies and graph flows, it proactively checks for any unauthorized information flows in the serverless application, and accepts or deny an incoming request at the point of ingress only. Thus, it optimizes the usage of resources well, avoids the attacks such as Denial-of-service. However, it was observed that some particular attacks such as denial-of-wallet attack is still possible in the WILL.IAM since the approach does not consider checking the intermediate function-level communication or permissions at every function level execution. Rather, it checks for end-to-end permissions.

In order to address these technical challenges existing with the state of the art approaches, method and system disclosed herein handles workflow validations in serverless systems. The system is configured to perform the workflow validation in two levels/stages. The system performs a first level validation at a point of ingress of a sequence of functions forming a workflow to verify whether a user access is to be allowed to a function at the ingress point, and if the first level validation fails, user access to the workflow is denied. Post execution of the function at the ingress point, if access is requested to additional functions, then at critical intermediate function calls, the system performs a second level of validation. Access to the functions at the critical intermediate function calls is permitted only if the second level validation is successful, else the access is denied. The first level validation as well as the second level validation are done based on pre-defined access policies, which are stored in encrypted format to preserve privacy and to add data security.

Referring now to the drawings, and more particularly to FIG. 1 through FIG. 6E, where similar reference characters denote corresponding features consistently throughout the figures, there are shown preferred embodiments and these embodiments are described in the context of the following exemplary system and/or method.

FIG. 1 illustrates an exemplary system for workflow validation in serverless platforms, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of workflow validation, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the workflow validation.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the example implementation depicted in FIG. 5, and steps in flow diagrams in FIG. 2 through FIG. 4.

FIG. 2 is a flow diagram depicting steps involved in the process of workflow validation in serverless platforms, by the system of FIG. 1, according to some embodiments of the present disclosure.

Figure 5:
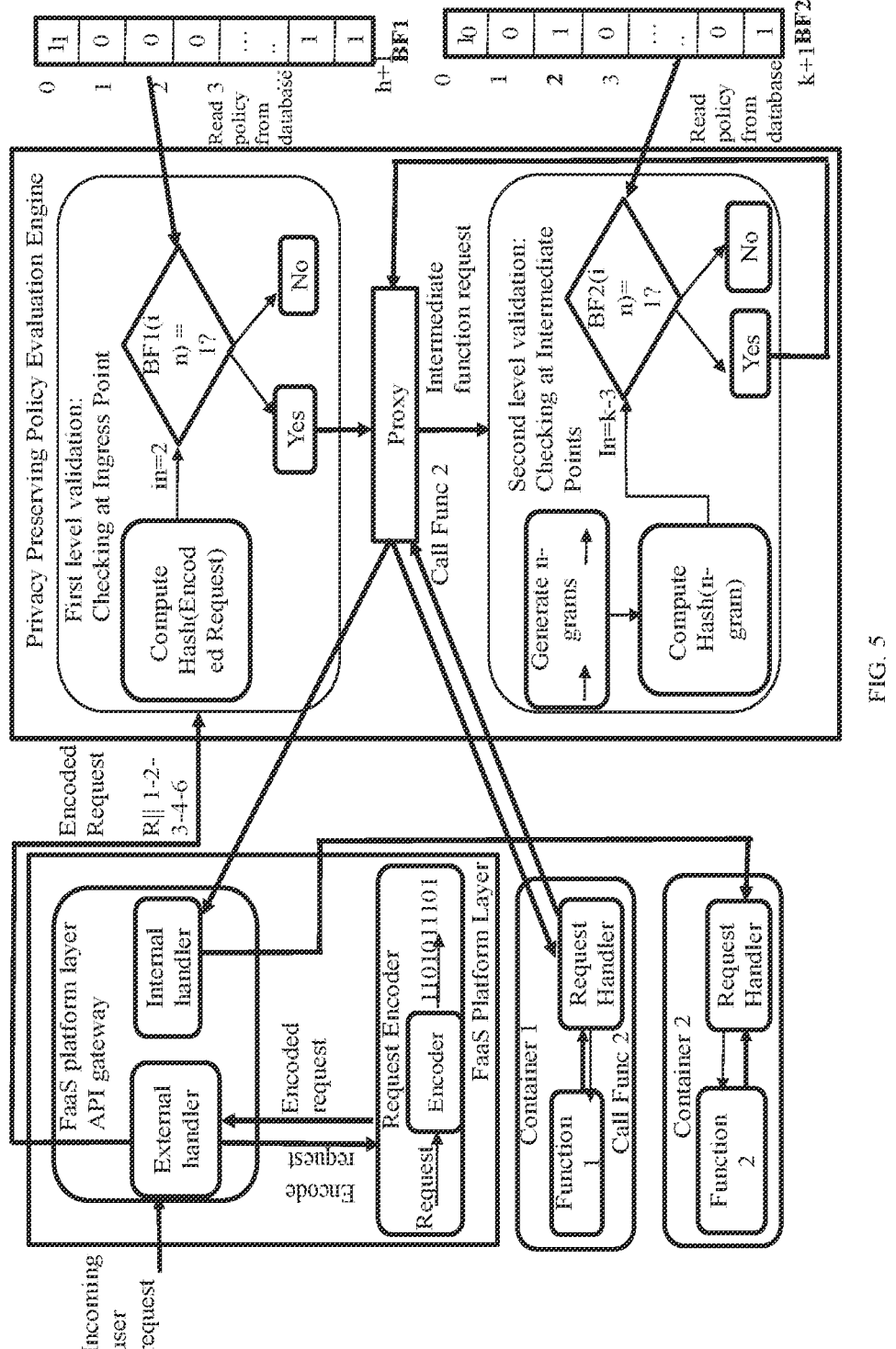
FIG. 5 depicts an example implementation of the system in FIG. 1 and a corresponding workflow and the workflow validation, according to some embodiments of the present disclosure.
Figure 6A:
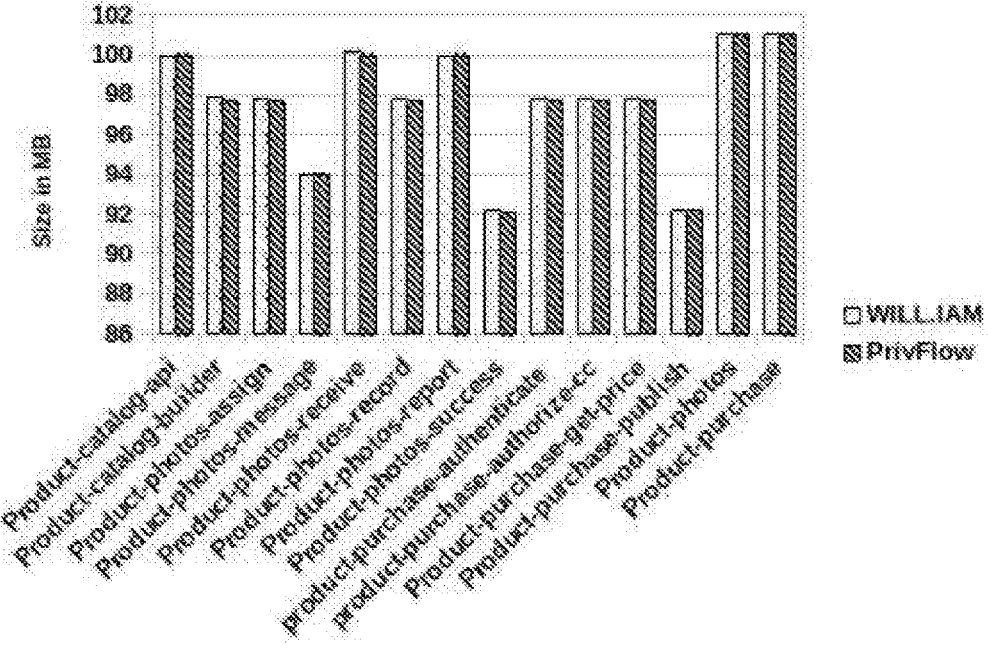
FIGS. 6A through 6E depict comparison between the method 200 and a state of the art approach, in terms of a plurality of parameters, according to some embodiments of the present disclosure.
Figure 6B:
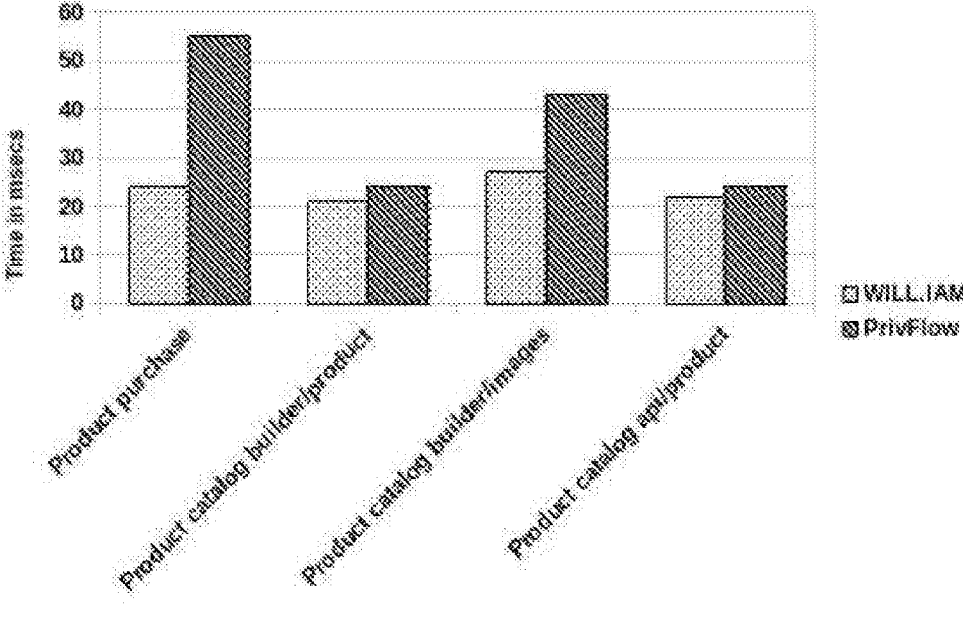
Figure 6C:
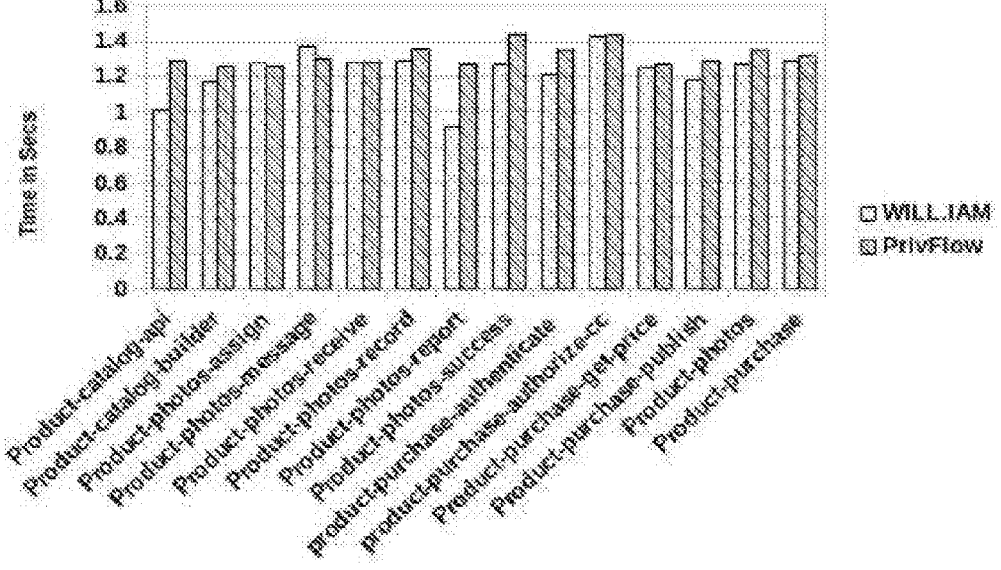
Figure 6D:
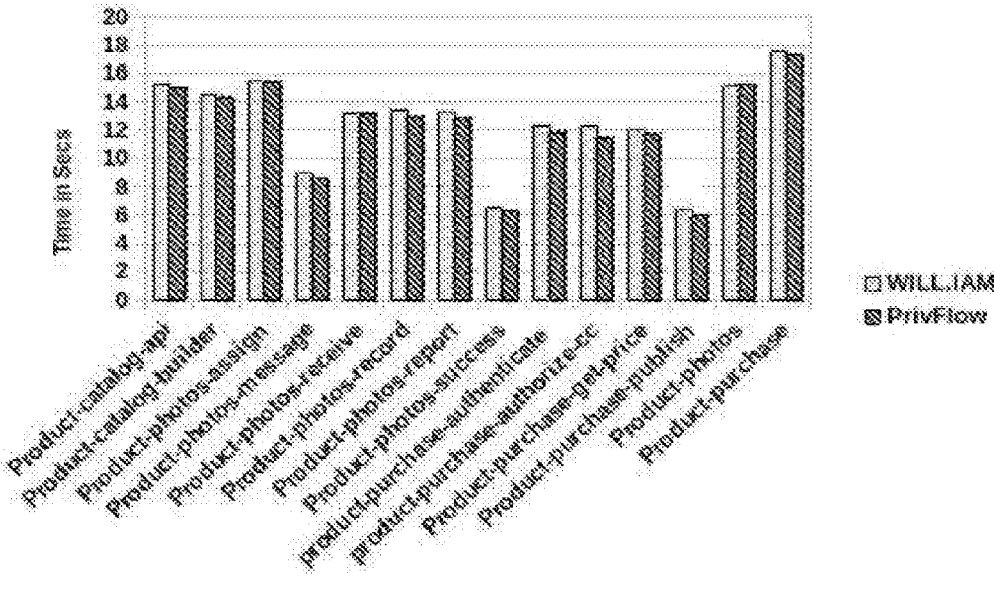
Figure 6E:
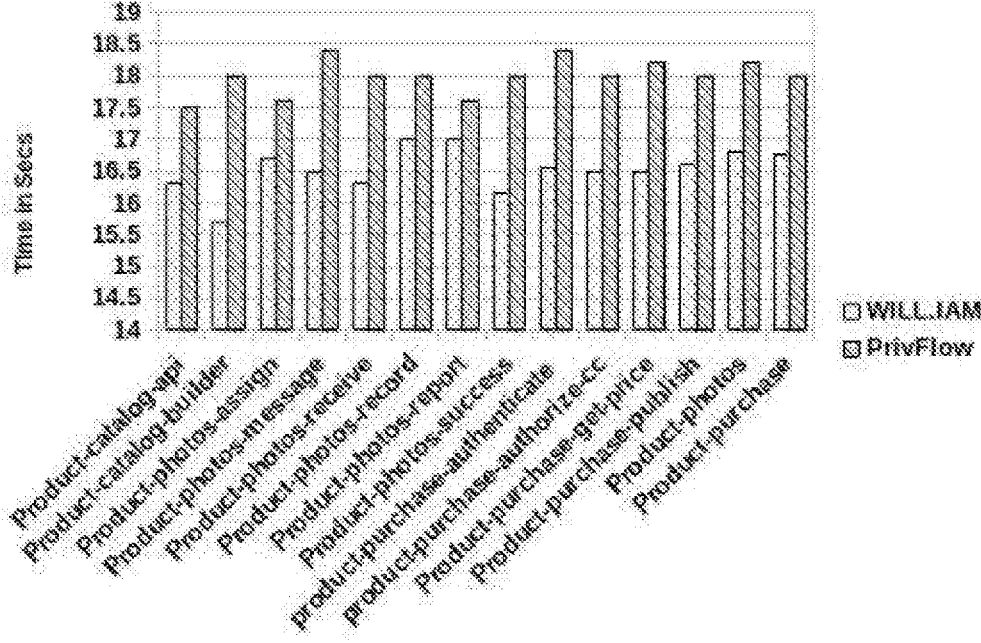

Steps in a method 200 in FIG. 2 are explained with reference to the components of the system 100 and the components depicted in the example implementation in FIG. 5. In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the system 100 obtains via the external handler implemented by the one or more hardware processors 102, a user request pertaining to a workflow execution in a serverless computing system. The workflow is a sequence of a plurality of functions in a specific order. In an embodiment, different users may have different roles assigned. Workflow permissions (alternately referred to as 'function execution sequence') maybe role specific, or may be assigned at individual level. For example, all users who serve same role, may have same workflow permissions. In another example, two users who have same role may have different workflow permissions. In various embodiments, the workflow permissions maybe pre-configured and may be dynamically changed/updated/edited. In yet another embodiment, a user may have multiple roles, and in turn may have different workflow permissions.

Further, at step 204 of the method 200, a request encoder implemented by the one or more hardware processors 102 encodes a user role and a function execution sequence extracted from the user request to generate an encoded request. The encoded request maybe in "Role∥sequence" format, where 'Role' indicates role of the user who generated the user request, and 'sequence' is the corresponding function execution sequence, extracted from the user request. The encoded request maybe a binary formatted string. Let the serverless application consists of N functions. The incoming request is encoded as $E(req)=R\|sequence$. The request encoder assigns p-bits to define a particular authorization role denoted as R. Based on the total number of roles a user could have, the system 100 selects the number of p bits. For a requested workflow, the function execution sequence is generated by the request encoder. Considering each serverless function to be represented by a unique label ranging from 0 to (N−1), the sequence is given as the ordering of labels (each separated by a delimiter '−') present in the requested workflow. The request encoder has knowledge of only the function execution sequence associated with a particular workflow and does not know about the role based permissions required to access the workflow which determines the valid/invalid workflow.

For a user request with role denoted as 'role', and function execution sequence {i,j,k,l} in the range (0, N) denoted as $F_i{\rightarrow}F_j{\rightarrow}F_k{\rightarrow}F_l$, the encoded request is given as:

$$E(req)=R\|i-j-k-l$$

If the user request is from a user who has multiple roles, p-bits for each role is concatenated with the labels of the corresponding functions for which the role is assigned, each function separated by the delimiter. For an example, if multiple roles $R_1$, $R_2$ are assigned, say $R_1$ for function Fi and $R_2$ for the remaining function execution sequence, $F_j \rightarrow F_k \rightarrow F_l$, the encoded request is given as:

$$E(req)=R_1\|i-R_2\|j-k-l$$

At step 206 of the method 200, the system 100 invokes via the one or more hardware processors 102, execution of a function at a point of ingress, if a first level validation of the encoded request is successful. In an embodiment, the system 100 is configured to validate a user request to a particular function execution sequence in two stages i.e. the first level of validation and a second level of validation. The first level of validation and the second level of validation are performed by a privacy preserving policy evaluation engine implemented by the one or more hardware processors 102. The 'point of ingress' in the context of embodiments herein refers to a first node in a sequence of nodes in the serverless system at which a first function in the function execution sequence requested by the user request is located at. A node in which last function in the function execution sequence requested by the user request is located at, maybe termed as 'last node' or 'point of termination', and nodes between the point of ingress and the point of termination are termed as 'intermediate function calls', for any function execution sequence. The first level validation is performed to validate/ verify whether the user has valid permission to access the function at the point of ingress. Steps involved in the first level of validation are depicted in method 300 in FIG. 3, and are explained hereafter.

At step 302 of the method 300, a cryptographic function of the encoded request is computed to generate a transformed encoded request. The cryptographic function used maybe hash function, encryption, or any other similar type. Further, at step 304 of the method 300, the transformed encoded request is compared with a plurality of protected access policies stored in an authenticated data structure such as but not limited to a Bloom filter, wherein, the first level validation is determined as successful if the transformed encoded request is permitted by one or more of the plurality of protected access policies, and the first level validation is determined as failure if the transformed encoded request is not permitted by one or more of the plurality of protected access policies. In an embodiment, the plurality of protected access policies (alternately referred to as 'access policies') define function execution sequence that is permitted for a user, and are stored in an authenticated data structure (such as Bloom filter as in FIG. 5, however, any suitable data structure maybe used), in a privacy preserving and secured manner. If the first level of authentication is determined as successful, then the particular function access sequence encoded in the transformed encoded request is accepted for the role assigned and the function at the ingress point is executed at respective container i.e. container 1 in FIG. 5. Otherwise, the workflow is terminated at the point of ingress, and no further function execution is performed.

If the cryptographic function used is the hash function and authenticated data structure used is the Bloom filter, then the first level authentication is as follows. Value at a hash output generated by executing the hash function represents index position of the authenticated data structure for a plurality of access policies stored in it, and has a bit 1 or 0, wherein, the first level of validation is determined as successful if the index position has the bit 1 (which indicates that the encoded request is permitted by one or more of the plurality of access policies), and the first level of validation is determined as failure if the index position has bit 0 (which indicates that the encoded request is not permitted by one or more of the plurality of access policies).

Referring back to the method 200, at step 208 of the method 200, the system 100 performs via the one or more hardware processors 102, a second level validation of the encoded request, at each of a plurality of critical intermediate function calls of the serverless computing system to which access is requested post execution of the function at the point of ingress. In various embodiments, the critical intermediate function calls may include one or more (i.e. all or a subset) of the plurality of intermediate function calls. All the intermediate function calls maybe configured to be considered as the critical intermediate function calls, if the second level of validation is to be performed at each of the intermediate function calls. While this may improve security, having to perform the second level validation at all the intermediate function calls may increase system overhead. In order to reduce the system overhead and improve overall system performance, a subset of the intermediate function calls maybe considered as the critical intermediate function calls, and the second level of validation performs only in the subset of the intermediate function calls that have been considered as the critical intermediate function calls. Either of these two approaches maybe used as per requirements, with a tradeoff between accuracy and system overhead. Various steps involved in the second level of validation are depicted in method 400 in FIG. 4, and are explained hereafter.

At step 402 of the method 400, a generator in the privacy preserving policy evaluation engine generates an n-gram based on a) a previously invoked function, and b) a current function invocation request from the encoded request. The 'current function invocation request' at any instance refers to a user request to a particular function execution sequence, that is being processed at that instance. The 'previously invoked function' in this context refers to the function that was executed immediately prior to the current function invocation request. The n-gram thus captures relation between the successive functions being executed. Further, at step 404 of the method 400, the privacy preserving policy evaluation engine computes a cryptographic function of the n-gram and a corresponding user role to generate a transformed n-gram. Further, at step 406 of the method 400, the system 100 compares the transformed n-gram with a plurality of protected access policies stored in the authenticated data structure. The second level validation is determined as successful if the current function invocation request is permitted by one or more of the plurality of protected access policies, and the second level validation is determined as failure if the current function invocation request is not permitted by one or more of the plurality of protected access policies.

If the cryptographic function used is the hash function and authenticated data structure used is the Bloom filter, then the second level authentication is as follows. Value at a hash output generated by executing the hash function represents index position of the authenticated data structure for a plurality of access policies stored in it, and has a bit 1 or 0, wherein, the second level of validation is determined as successful if the index position has the bit 1 (which indicates that the encoded request is permitted by one or more of the plurality of access policies), and the second level of validation is determined as failure if the index position has bit 0

(which indicates that the encoded request is not permitted by one or more of the plurality of access policies). In an embodiment, though FIG. 5 depicts that the access policies for the first level validation and the second level validation are stored in two separate authenticated data structures, they may be stored in the same authenticated data structure.

For all the critical intermediate function calls from among the plurality of critical intermediate function calls, for which the second level validation is successful, at step 210 of the method 200, the system 100 invokes, via the one or more hardware processors 102, corresponding function execution. At this stage, control gets transferred to respective container, where the function gets executed. In an embodiment, a process of second level validation ends a) when the second level validation is completed for all of the plurality of critical intermediate function calls, or b) the second level validation fails for any of the plurality of critical intermediate function calls.

In the second level of validation, based on number of roles assigned to the user who has requested access to the function execution sequence, there maybe two different cases.

Case 1: Single Role

Given the encoded request, denoted as $E(req)=R\|i-j-k-l$, the n-gram is generated for each intermediate function call i.e. directed towards functions in intermediate function calls. For a function $F_j$ where j is a label present in the function execution sequence, the n-gram is defined a contiguous sequence of n labels with j as the $n^{th}$ label and the labels in function execution sequence preceding j constitute the n−1 labels. The labels in the n-gram are separated by a delimiter '−'. Value of n=2. Hence, the valid n-gram for function $F_j$ is denoted as $R\|i-j$.

Case 2: Multiple Roles

Given the encoded request (assume to be assigned with multiple roles, say $R_1$, $R_2$), denoted as $E(req)=R_1\|i-R_2\|j-k-l$, the valid n-gram for function Fj is denoted as $R_2\|i-j$ since the role $R_2$ is assigned to function Fj.

In case of users having multiple roles, along with ordering of intermediate function calls, it is a necessity to check the roles at every intermediate function calls. Therefore, the system 100 combines the role with generated n-grams and is further processed as in steps 402 through 406 of the second level of validation.

EXPERIMENTAL RESULTS

FIGS. 6A through 6E depict comparison between the method 200 and a state of the art approach, in terms of a plurality of parameters, according to some embodiments of the present disclosure. The experiments were conducted by benchmarking performance of the system 100 with an opensource serverless application Hello Retail. There were fourteen functions in the application. Values of parameters such as build size, build time (time taken to build the function), deploy time (time taken to deploy the function on the kubernetes cluster) and teardown time (time taken to delete the function instance) of these functions were calculated and average time after thirty invocations was measured. Obtained values were compared with corresponding values obtained for state of the art WILL.IAM scheme. Four workflows were run and query response time with an average of thousand invocations was measured. It was observed that even though the approach executed by the system 100 is privacy preserving when compared to WILL.IAM, the build size, build time and teardown time of the method 200 is in similar lines of the state of art approach. However the deploy time of method 200 is taking half to 1 sec longer to WILL.IAM. In terms of the query response time it was observed that complex workflows like product-purchase took more time than WILL.IAM due to level two Bloom filter checking. Based on the results it was inferred that even though the method 200 is privacy preserving it is not creating performance overhead when compared to state of the art WILL.IAM. These are depicted in the graphs in FIG. 6A through 6E. In the graphs, 'PrivFlow' refers to the method 200, and WILL.IAM refers to the state of the art approach. An example workflow sequence and corresponding first level and second level validations are explained below.

Consider a serverless workflow of Product-Purchase wherein for a given customer name, credit card number and product id, corresponding value of charged amount is fetched from the database. This workflow includes the following function sequence calls:

Product-Purchase (F9)→product-purchase-get-price-→product-purchase-authorize-cc (F11)→product-purchase-publish (F12).

Two Bloom filters BF1 (for level 1 validation) and BF2 (for level 2 validation) are used, which are prepopulated with values computed by SHA256 based Hash(role+function number) for the functions in the workflow.

BF1={"b6589fc6ab0dc82cf12099d1c2d40ab994e8410c", "056e7836364ee211 2e626e4e1a73b0381deb875a", "0","77de68daecd823babbb58edb1c8e14d71 06e83bb","0","0","0","0","0", "8766f9a0d7e758a06fbe632473e6171748ac84d7", "0","0","0","0"}

BF2=[14]string{"0","0","0","0","0","0","0","0","0", "0","8793447ef2a70a160c0e3 4caa9383861cb24c3ed", "082a9c46edfd52db890fb7bb6a470f5f3e5bebe2","e 14386bf502980c8d77cea0c6810202661b93a81","0"}

Data in BF1 is used for the first level validation, that includes the SHA256 hash of string represented role+function number of ingress function of the workflow. During the experiment conducted, Hash(customer+9) =8766f9a0d7e758a06fbe632473e6171748ac84d7 was considered, which is present in BF1, and as a result the first level validation is successful.

Further the system 100 proceeds to intermediate calls of the workflow which includes checking for intermediate function call F10→F11→F12 and hash values are calculated accordingly Hash(role+previous_function+current_function) and are checked in the second level validation.

Accordingly when sequence is executed F10→F11→F12, the corresponding hash(customer+9+10) =8793447ef2a70a160c0e34caa9383861cb24c3ed, hash (customer+10+11) =082a9c46edfd52db890fb7bb6a470f5f3e5bebe2, and hash (customer+11+12) =e14386bf502980c8d77cea0c6810202661b93a81 were calculated and compared with the values in BF2 at each step. If the hash values calculated at each step are present in BF2 then the workflow is executed successfully.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of security in serverless computing systems. The embodiment, thus provides a method and system of multiple levels of validation to secure workflow access at end to end function execution sequence level and at intermediate levels. Moreover, the embodiments herein further provides a mechanism of allowing/denying function execution sequence access at a point of ingress and at intermediate levels, based on success or failure of validation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
obtaining, via one or more hardware processors, a user request pertaining to a workflow execution in a serverless computing system, wherein a workflow is a sequence of a plurality of functions in a specific order;
encoding, via the one or more hardware processors, a user role and a function execution sequence extracted from the user request to generate an encoded request;
invoking, via the one or more hardware processors, execution of a function at a point of ingress, if a first level validation of the encoded request is successful;
performing, via the one or more hardware processors, a second level validation of the encoded request, at each of a plurality of critical intermediate function calls of the serverless computing system to which access is requested post execution of the function at the point of ingress; and
invoking, via the one or more hardware processors, a function execution at each of the plurality of critical intermediate function calls, if the second level validation is successful, wherein the second level validation at each of the plurality of critical intermediate function calls comprises:
generating an n-gram based on a) a previously invoked function, and b) a current function invocation request from the encoded request;
computing a cryptographic function of the n-gram and a corresponding user role to generate a transformed n-gram; and
comparing the transformed n-gram with a plurality of protected access policies stored in the authenticated data structure, wherein,
the second level validation is determined as successful if the current function invocation request is permitted by one or more of the plurality of protected access policies, and the second level validation is determined as failure if the current function invocation request is not permitted by one or more of the plurality of protected access policies.

2. The processor implemented method of claim 1, wherein the first level validation comprises:
computing a cryptographic function of the encoded request to generate a transformed encoded request; and
comparing the transformed encoded request with a plurality of protected access policies stored in an authenticated data structure, wherein,
the first level validation is determined as successful if the transformed encoded request is permitted by one or more of the plurality of protected access policies, and the first level validation is determined as failure if the transformed encoded request is not permitted by one or more of the plurality of protected access policies.

3. The processor implemented method of claim 2, wherein the user request is denied if the first level validation is determined as failure.

4. The processor implemented method of claim 1, wherein the current function invocation request is denied if the second level validation is determined as failure.

5. The processor implemented method of claim 1, wherein the plurality of critical intermediate function calls may comprise one or more of a plurality of intermediate function calls of the serverless computing system.

6. A system, comprising:

one or more hardware processors;

a communication interface; and a memory storing a plurality of instructions, wherein the plurality of instructions cause the one or more hardware processors to:

obtain a user request pertaining to a workflow execution in a serverless computing system, wherein a workflow is a sequence of a plurality of functions in a specific order;

encode a user role and a function execution sequence extracted from the user request to generate an encoded request;

invoke execution of a function at a point of ingress, if a first level validation of the encoded request is successful;

perform a second level validation of the encoded request, at each of a plurality of critical intermediate function calls of the serverless computing system to which access is requested post execution of the function at the point of ingress; and invoke a function execution at each of the plurality of critical intermediate function calls, if the second level validation is successful, wherein performing the second level validation at each of the plurality of critical intermediate function calls by:

generating an n-gram based on a) a previously invoked function, and b) a current function invocation request from the encoded request;

computing a cryptographic function of the n-gram and a corresponding user role to generate a transformed n-gram; and comparing the transformed n-gram with a plurality of protected access policies stored in the authenticated data structure, wherein, the second level validation is determined as successful if the current function invocation request is permitted by one or more of the plurality of protected access policies, and the second level validation is determined as failure if the current function invocation request is not permitted by one or more of the plurality of protected access policies.

7. The system of claim 6, wherein the one or more hardware processors are configured to perform the first level validation by:

computing a cryptographic function of the encoded request to generate a transformed encoded request; and comparing the transformed encoded request with a plurality of protected access policies stored in an authenticated data structure, wherein, the first level validation is determined as successful if the transformed encoded request is permitted by one or more of the plurality of protected access policies, and the first level validation is determined as failure if the transformed encoded request is not permitted by one or more of the plurality of protected access policies.

8. The system of claim 7, wherein the one or more hardware processors are configured to deny the user request if the first level validation is determined as failure.

9. The system of claim 6, wherein the one or more hardware processors are configured to deny the current function invocation request if the second level validation is determined as failure.

10. The system of claim 6, wherein the one or more hardware processors are configured to consider one or more of a plurality of intermediate function calls of the serverless computing system as the plurality of critical intermediate function calls.

11. One or more non-transitory machine-readable information storage mediums comprising one or more instructions which when executed by one or more hardware processors cause:

obtaining a user request pertaining to a workflow execution in a serverless computing system, wherein a workflow is a sequence of a plurality of functions in a specific order;

encoding a user role and a function execution sequence extracted from the user request to generate an encoded request;

invoking execution of a function at a point of ingress, if a first level validation of the encoded request is successful;

performing a second level validation of the encoded request, at each of a plurality of critical intermediate function calls of the serverless computing system to which access is requested post execution of the function at the point of ingress; and invoking a function execution at each of the plurality of critical intermediate function calls, if the second level validation is successful, wherein the second level validation at each of the plurality of critical intermediate function calls comprises:

generating an n-gram based on a) a previously invoked function, and b) a current function invocation request from the encoded request;

computing a cryptographic function of the n-gram and a corresponding user role to generate a transformed n-gram; and comparing the transformed n-gram with a plurality of protected access policies stored in the authenticated data structure, wherein, the second level validation is determined as successful if the current function invocation request is permitted by one or more of the plurality of protected access policies, and the second level validation is determined as failure if the current function invocation request is not permitted by one or more of the plurality of protected access policies.

12. The one or more non-transitory machine-readable information storage mediums of claim 11, wherein the first level validation comprises:

computing a cryptographic function of the encoded request to generate a transformed encoded request; and comparing the transformed encoded request with a plurality of protected access policies stored in an authenticated data structure, wherein, the first level validation is determined as successful if the transformed encoded request is permitted by one or more of the plurality of protected access policies, and the first level validation is determined as failure if the transformed encoded request is not permitted by one or more of the plurality of protected access policies.

* * * * *